US007943049B1

(12) United States Patent
Alcantar et al.

(10) Patent No.: US 7,943,049 B1
(45) Date of Patent: May 17, 2011

(54) WATER PURIFICATION METHOD USING PLANT MOLECULES

(75) Inventors: Norma A. Alcantar, Tampa, FL (US); Babu Joseph, Tampa, FL (US); Kevin Young, Plant City, FL (US)

(73) Assignee: University of South Florida, Tampa, FL (US)

( * ) Notice: Subject to any disclaimer, the term of this patent is extended or adjusted under 35 U.S.C. 154(b) by 338 days.

(21) Appl. No.: 11/934,932

(22) Filed: Nov. 5, 2007

Related U.S. Application Data

(60) Provisional application No. 60/864,207, filed on Nov. 3, 2006.

(51) Int. Cl.
*C02F 1/54* (2006.01)
*C02F 1/62* (2006.01)
(52) U.S. Cl. .......... 210/728; 210/730; 210/911; 210/912
(58) Field of Classification Search .................. 210/730
See application file for complete search history.

(56) References Cited

U.S. PATENT DOCUMENTS

| | | | | |
|---|---|---|---|---|
| 2,117,378 A | * | 5/1938 | Tiffany | 210/730 |
| 2,845,363 A | * | 7/1958 | Gutzeit | 106/205.01 |
| 5,000,857 A | * | 3/1991 | Kunkel | 210/708 |
| 5,851,398 A | * | 12/1998 | Adey | 210/602 |
| 5,853,576 A | | 12/1998 | Kapulnik et al. | |
| 5,876,484 A | | 3/1999 | Raskin et al. | |
| 6,576,816 B2 | | 6/2003 | Terry et al. | |
| 6,974,896 B1 | | 12/2005 | Terry et al. | |
| 7,014,776 B1 | * | 3/2006 | DeBusk | 210/711 |
| 7,455,863 B2 | * | 11/2008 | Hamann | 424/767 |
| 2004/0197812 A1 | | 10/2004 | Ma et al. | |
| 2005/0198707 A1 | | 9/2005 | Meagher et al. | |

OTHER PUBLICATIONS

Sen, A.K.; Mondal, N.G. 1990. Removal and uptake of Copper(II) by *Salvinia natus* from waste water. Air and Soil Pollution WAPLAC. 49: 1-6.
Misbahuddin, M.; Fariduddin, A. 2002. Water hyacinth removes arsenic from arsenic-contaminated drinking water. Arch. Environ. Health. 57: 516-518.
Tu, S.; Ma, L.Q.; Fayiga, A.O.; Zillioux, E.J. 2004. Phytoremediation of Arsenic-Contaminated Groundwater by the Arsenic Hyperaccumulating fern *Pteris vittata* L. Int. J. Phytoremediation. 6: 35-47.
Robinson, B.; Duwig, C.; Bolan, N.; Kannathasan, M.; Saravanan, A. 2003. Uptake of Arsenic by New Zealand watercress (*Lepidium sativum*). Science of the Total Environment. 301: 67-73.
Robinson, B.; Duwig, C.; Bolan, N.; Kannathasan, M.; Saravanan, A. 1990. Toxicity and Accumulation of Chromium in *Ceratophyllum demersum* L. Bull. Environ. Contam. Toxicol. 44: 473-478.

(Continued)

*Primary Examiner* — Peter A Hruskoci
(74) *Attorney, Agent, or Firm* — Robert Varkonyi; Smith & Hopen, P.A.

(57) ABSTRACT

Arsenic is a poisonous metalloid which, because of its hydroscopic nature, is primarily transported through water. Most plant species, including the nopal cactus, produce a sticky substance called mucilage. Mucilage swells in water but is insoluble and can precipitate ions, bacteria and particles from aqueous solutions. The invention includes a method of separating particulates and heavy metals such as arsenic (As) from drinking water using natural flocculants obtained from cactus mucilage. The extraction techniques and the methodology for using the cactus mucilage obtain higher As removal than conventional methods, like aluminum sulfate precipitation.

17 Claims, 12 Drawing Sheets

OTHER PUBLICATIONS

Davis, T.A.; Ali, F.E.C.; Giannitti, E.; Volesky, B.; Mucci, A. 2004. Cadmium biosorption by S-fluitans: Treatment, resilience and uptake relative to other Sargassum spp. and brown algae. Water Quality Research Journal of Canada. 39: 183-189.

Zimmels, Y.; Kirzhner, F.; Roitman, S. 2004. Use of naturally growing aquatic plants for wastewater purification. Water Environment Research. 76: 220-230.

Zhang, W.; Cai, Y.; Tu, C.; Ma, L.Q. 2002. Arsenic speciation and distribution in an arsenic hyperaccumulating plant. Science of the Total Environment. 300: 167-177.

Zita et al., Effefcts of Ionic Strength on bacterial Adhesion and Stability of Flocs in a Wastewater Activated Sludge System, Applied and Environmental Microbiology, 1994, vol. 60, No. 9, pp. 3041-3048.

Miller et al., Toward Understanding the Efficacy and Mechanism of Opuntia spp. as a Natural Coagulant for Potential Application in Water Treatment, Environmental Science & Technology, 2008, vol. 42, No. 12, pp. 4274-4279.

Unger et al., Assessing Escherichia Coli Removal in the Schmutzdecke of Slow-Rate Biofilters, Journal AWWA, 2008, vol. 100, No. 12, pp. 60-74.

Garg et al., Toxicity and Accumulation of Chromium in Ceratophyllum Demersum L, Bulletin of Environmental Contamination and Toxicology (USA), 1990, vol. 44, No. 3, pp. 473-478.

Mintz et al., Not Just a Drop in the Bucket: Expanding Access to Point-of-Use Water Treatment Systems, American Journal of Public Health, 2001, vol. 91, No. 10, pp. 1565-1570.

Quick et al., Diarrhoea Prevention in Bolivia through Point-of-Use Water Treatment and Safe Storage: a Promising New Strategy, Epidemiol. Infect., 1999, vol. 122, pp. 83-60.

Sanin et al., Bioflocculation of Activated Sludge: The Role of Calcium Ions and Extracellular Polymers, Environmental Technology, 2000, vol. 21, No. 12, pp. 1405-1412.

Curtis et al., Review: Domestic Hygiene and Diarrhoea—Pinpointing the Problem, Tropical Medicine and International Health, 2000, vol. 5, No. 1, pp. 22-32.

Hrudey et al., Published Case Studies of Waterborne Disease Outbreaks-Evidence of a Recurrent Treat, Water Environment Research, 2007, vol. 79, pp. 233-245.

Goycoolea et al., Pectins from Opuntia spp.: A Short Review, Journal of the Porfessional Association for Cactus Development, 2003, vol. 5, pp. 17-29.

Larsen et al., The Effect of Calcium Ions on Adhesion and Competitive Exclusion of Lactobacillus ssp. And E. Coli O138, International Journal of Food Microbiology, 2007, vol. 114, pp. 113-119.

Griffith, The Origins of an Important Cactus Crop, Opuntia Ficus-Indica (Cactaceae): New Molecular Evidence, American Journal of Botany, 2004, vol. 91, No. 11, pp. 1915-1921.

Medina-Torres et al., Rheological Properties of the Mucilage Gum (Opuntia Ficus Indica), Food Hydrocolloids, 2000, vol. 14, pp. 417-424.

Cunningham, Cactus Goo Purifies Water, Science News, 2005, pp. 1-2.

Bacterial Water Quality Standards for Recreational Waters (Freshwater and Marine Waters Status Report), U.S. Environmental Protection Agency, Jun. 2003, pp. 1-4.

Young, The Mucilage of Opuntia Ficus Indica: a Natural, Sustainable, and Viable Water Treatment Technology for Use in Rural Mexico for Reducing Turbidity and Arsenic Contamination in Drinking Water, College of Engineering, University of South Florida, 2006, pp. 52-57 and pp. 62-69.

The Millennium Development Goals Report 2007, United Nations, New York, 2007, pp. 23-26.

Human Development Report 2006, Beyond Scarcity: Power, Poverty and the Global Water Crisis, United Nations Development Programme, New York, NY, 2006, pp. 2-3.

Human Development Report 2003, Millennium Development Goals: A Compact Among Nations to End Human Poverty, United Nations Development Programme: New York, NY, 2003, pp. 17, 35, 61, 89-91, 103-107, 123-125, and 136-143.

* cited by examiner

| | GE (mg L$^{-1}$) | Δ [As] (μg L$^{-1}$) |
|---|---|---|
| As(III) | 30 | 142.80 |
| As(V) | 30 | 147.30 |

Figure 10.

WATER PURIFICATION METHOD USING PLANT MOLECULES

CROSS REFERENCE TO RELATED APPLICATION

This application claims priority to currently pending U.S. Provisional Patent Application No. 60/864,207, entitled "Method of Removing Arsenic from Drinking Water using Cactus Mucilage", filed on Nov. 3, 2006, the contents of which are herein incorporated by reference.

GOVERNMENT INTEREST

This invention was made with Government support under Grant 0442977, awarded by the National Science Foundation, BE-MAT USE: SCIENCE, ENG & SOCIETY. The Government has certain rights in the invention.

FIELD OF INVENTION

This invention relates to field water purification. Specifically, a water purification method using plant mucilage.

BACKGROUND OF THE INVENTION

Arsenic is a metalloid with similar properties to phosphorus. Arsenic oxidizes to form hygroscopic, colorless, odorless $As_2O_3$ and $As_2O_5$. The principal means of arsenic dispersion through nature is via water, and varies from locations based on soil and arsenic forms.

Arsenic has been attributed to changes in respiratory, gastrointestinal, hematopoietic, and cardiovascular systems. Because of the similarities between arsenic and phosphorus, arsenic can substitute in place of phosphorus in some biological reactions, making it poisonous. Particularly, consumption of arsenic-contaminated water may enter the metabolic citric cycle, inhibiting succinate dehydrogenase and preventing ATP production. Arsenic poisoning is cumulative and symptoms include nausea, vomiting, stomach aches, diarrhea, and delirium. Ingested arsenic is deposited into fingernails and skin Further, arsenic can remain in hair follicles for years following the arsenic exposure.

Bangladesh, India, and Nepal have experienced a massive epidemic from arsenic groundwater contamination. 35 million people are believed to be consuming water with at least 50 µg/L, and 57 million people drinking water with at least 10 µg/L of arsenic. Nongovernmental organizations entered the region and established tube wells to collect groundwater and prevent the indigenous populations from using bacteria-contaminated surface water. Over 8 million wells were built since the program began in the 1970s. Roughly one quarter of Bangladesh's population now rely on water collected from tube-wells for drinking. However, testing has revealed one in five of the tube wells are contaminated by water containing ten to fifty times the arsenic levels considered safe by the World Health Organization.

Most plant species produce an exopolysaccharide, a polymer of mono- and polysaccharides and proteins bonded by glycosidic bonds, referred to as mucilage. Plants secrete the substance to slow water loss, aid germination, and store food.

The tuna cactus (*Opuntia ficus* indica) mucilage produced by the flattened pads of this cactus was of particular interest. It can easily be recognized by its green, thick long pads, one linked to the next. The nopal plants are very inexpensive to cultivate and edible. Nopal pads are formed of complex carbohydrates that have the ability to store and retain water, allowing these plants to survive in extremely arid environments. Nopal mucilage is a neutral mixture of approximately 55 high-molecular weight sugar residues composed basically of arabinose, galactose, rhamnose, xylose, and galacturonic acid and has the capacity to interact with metals, cations and biological substances.

Mucilage is used in producing agar and used as an adhesive Importantly, mucilage swells in water but is insoluble. As such, the substance has the potential to precipitate ions, bacteria and particles from aqueous solutions. Further, the material has unique surface active characteristics, making it an ideal candidate for enhancing dispersion properties, creating emulsifications, and reducing surface tension of high polarity liquids.

SUMMARY OF INVENTION

The invention includes a method of separating particulates and heavy metals such as arsenic (As) from drinking water using natural flocculants obtained from cactus (i.e. cactus mucilage). The extraction techniques and the methodology for using the cactus mucilage obtain higher As removal than previous methods. The use of low cost flocculants can be implemented in low income communities or third world countries with drinking water deficiency.

A gelling extract (GE), a nongelling extract (NE), and a combined extract (CE) of mucilage from the cactus were collected and used individually as flocculent to remove contaminants that reduce water potability.

Cylinder tests using kaolin slurry show mucilage is a better flocculent of suspended solids than $Al_2(SO_4)_3$. The same dosage of mucilage precipitates the same amount of particulate, in one third the time, as does $Al_2(SO_4)_3$. Additionally, small doses of mucilage provided fast settling rates and clear supernatant.

The effective concentration of gelling extract mucilage was found to be 4 mg/L. This concentration precipitated most of the slurry within 10 minutes, twice as fast as the next quickest concentration, 3 mg/l; showing the gelling extract was most effective at higher concentrations. The non-gelling mucilage extract was less affected by concentration.

Flocculation studies using the standard jar test and kaolin slurry solutions were performed on the three extracts. At lower concentrations, the combined mucilage extract mirrors the residual turbidity characteristics of aluminum sulfate, where higher concentrations of aluminum sulfate are more effective at reducing the residual turbidity of the solution.

The capacity of the gelling mucilage extract to remove arsenic from contaminated water at low concentration dosing was determined by adding gelling mucilage extract to a contaminated water column. The top layer of the water column was removed at set intervals. The mucilage facilitates removal of arsenic by transporting arsenic to the water-air interface.

BRIEF DESCRIPTION OF THE DRAWINGS

For a fuller understanding of the invention, reference should be made to the following detailed description, taken in connection with the accompanying drawings, in which.

A commercial flocculent (3 ppm $Al_2(SO_4)_3$) and negative control without flocculent (control) were used to establish a baseline and compare the efficiencies of the extracts. The cylinder was capped and inverted 10 times to mix and the height of the interface between the supernatant and settling solids was measured. The gelling extract performed the best.

Figure 2:
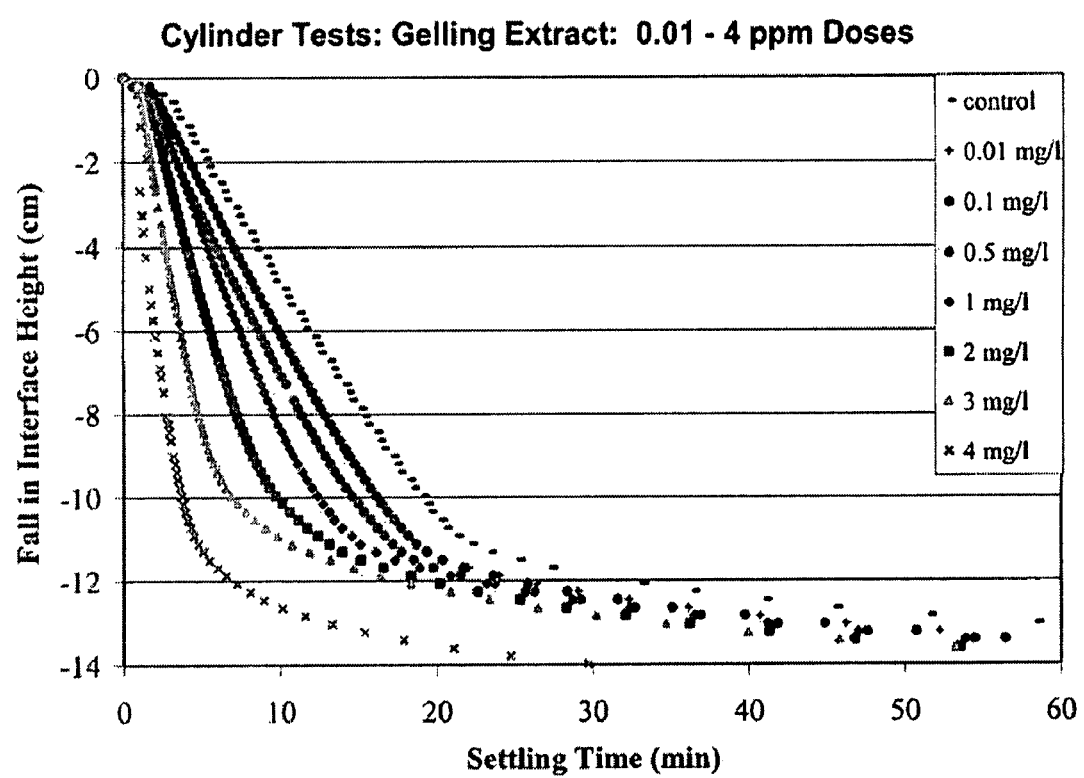

FIG. 2 is a graph showing increasing efficiency with increased concentration of gelling extract. A 50 g/L of kaolin clay slurry were placed into a 100 mL cylinder. Flocculent was added to the slurry as either 0.01 mg/L of mucilage, 0.1 mg/L of mucilage, 0.5 mg/L of mucilage, 1.0 mg/L of mucilage, 2.0 mg/L of mucilage, 3.0 mg/L of mucilage, 4.0 mg/L of mucilage, or a negative control without flocculent. The cylinder was capped and inverted 10 times to mix and placed on a horizontal surface. The height of the interface between the supernatant and settling solids was measured.

Figure 3:
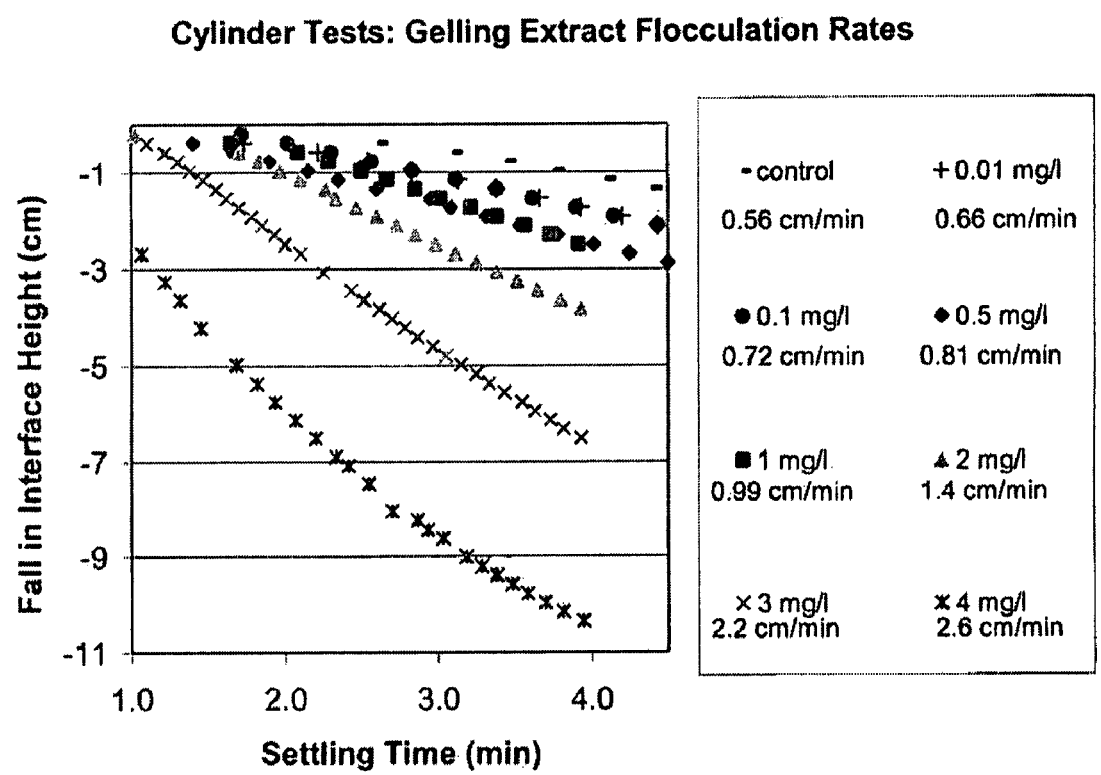

FIG. 3 is a graph and data illustrating the settling rates of gelling extract with increasing dosage concentration. A 50 g/L of kaolin clay slurry were placed into a 100 mL cylinder. Flocculent was added to the slurry as either 0.01 mg/L of gelling extract mucilage, 0.1 mg/L of gelling extract mucilage, 0.5 mg/L of gelling extract mucilage, 1.0 mg/L of gelling extract mucilage, 2.0 mg/L of gelling extract mucilage, 3.0 mg/L of gelling extract mucilage, 4.0 mg/L of gelling extract mucilage, or a negative control without flocculent. The cylinder was capped and inverted 10 times to mix and placed on a horizontal surface. The height of the interface between the supernatant and settling solids was measured and the rate of sedimentation calculated.

Figure 4:
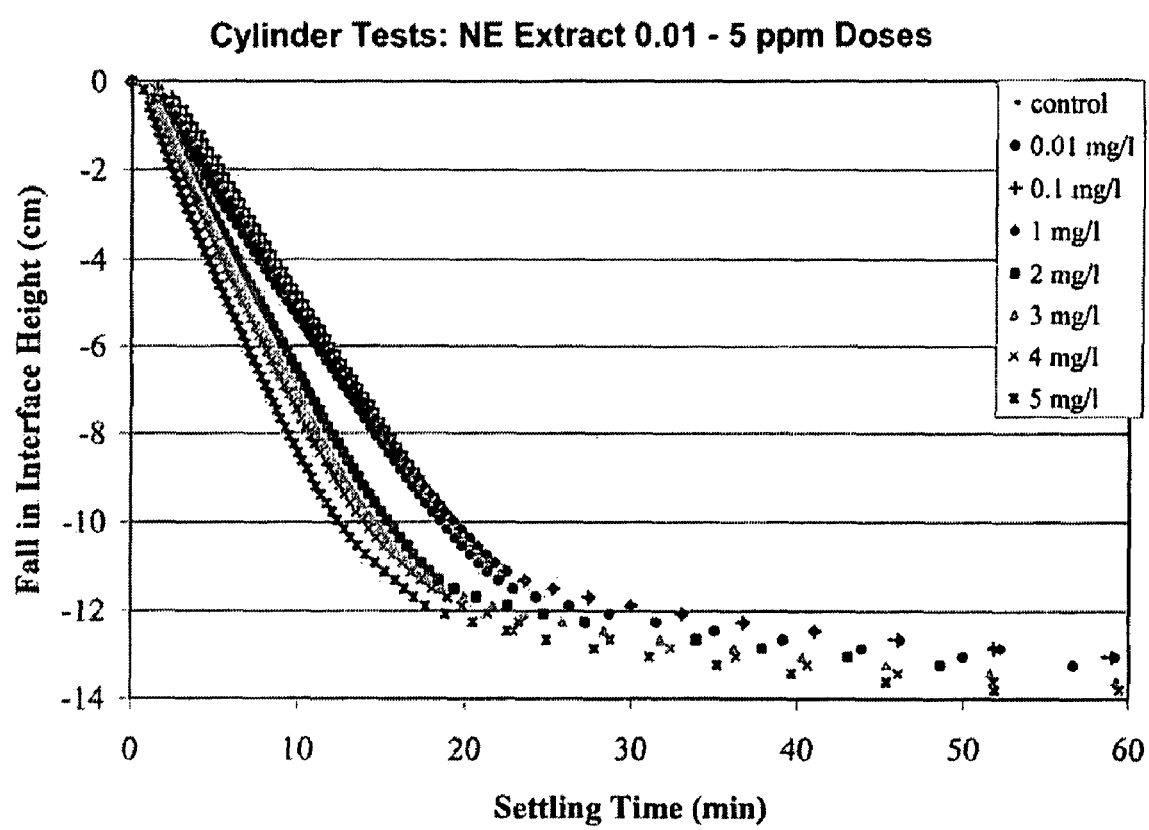

FIG. 4 is a graph showing the increasing settling efficiency of the non-gelling extract with increasing dosage concentrations. A 50 g/L of kaolin clay slurry were placed into a 100 mL cylinder. Flocculent was added to the slurry as either 0.01 mg/L of non-gelling extract mucilage, 0.1 mg/L of non-gelling extract mucilage, 1.0 mg/L of non-gelling extract mucilage, 2.0 mg/L of non-gelling extract mucilage, 3.0 mg/L of non-gelling extract mucilage, 4.0 mg/L of non-gelling extract mucilage, or a negative control without flocculent. The cylinder was capped and inverted 10 times to mix and placed on a horizontal surface. The height of the interface between the supernatant and settling solids was measured.

Figure 5:
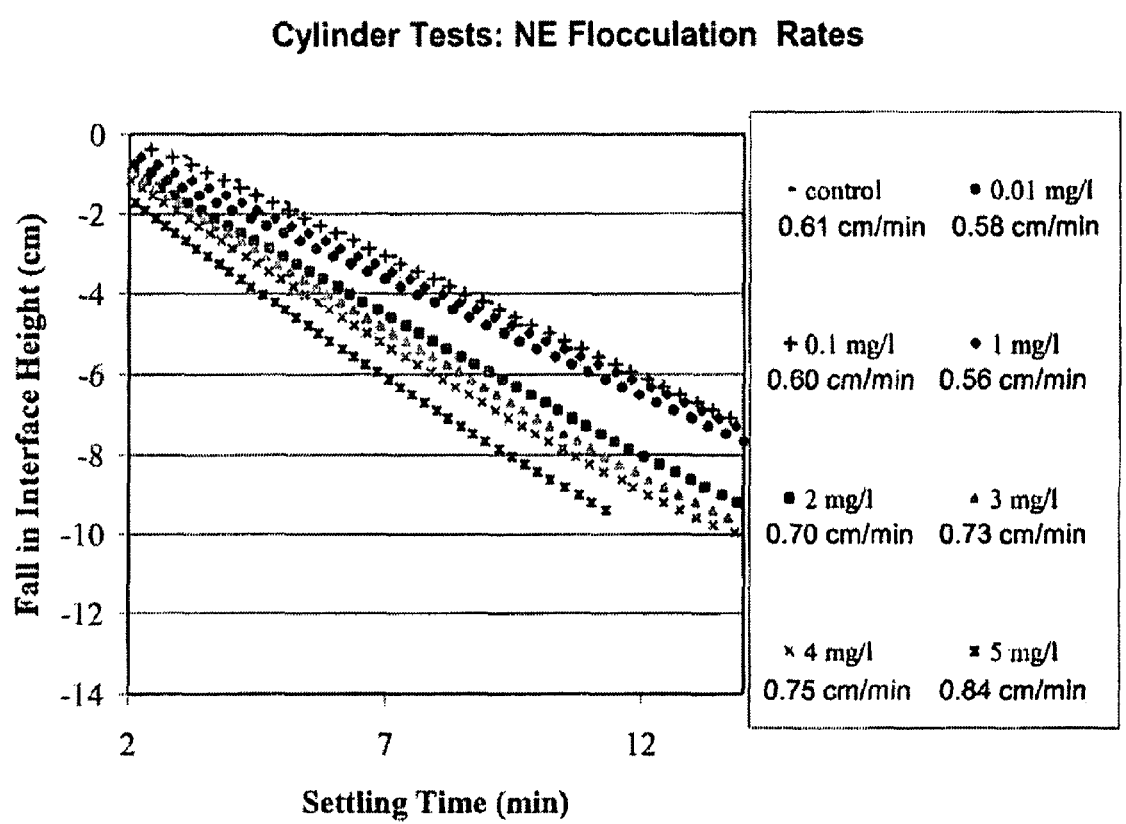

FIG. 5 is a graph and data illustrating the settling rates of non-gelling extract with increasing concentration. A 50 g/L of kaolin clay slurry were placed into a 100 mL cylinder. Flocculent was added to the slurry as either 0.01 mg/L of non-gelling extract mucilage, 0.1 mg/L of non-gelling extract mucilage, 1.0 mg/L of non-gelling extract mucilage, 2.0 mg/L of non-gelling extract mucilage, 3.0 mg/L of non-gelling extract mucilage, 4.0 mg/L of non-gelling extract mucilage, or a negative control without flocculent. The cylinder was capped and inverted 10 times to mix and placed on a horizontal surface. The height of the interface between the supernatant and settling solids was measured and the rate of sedimentation calculated.

Figure 6:
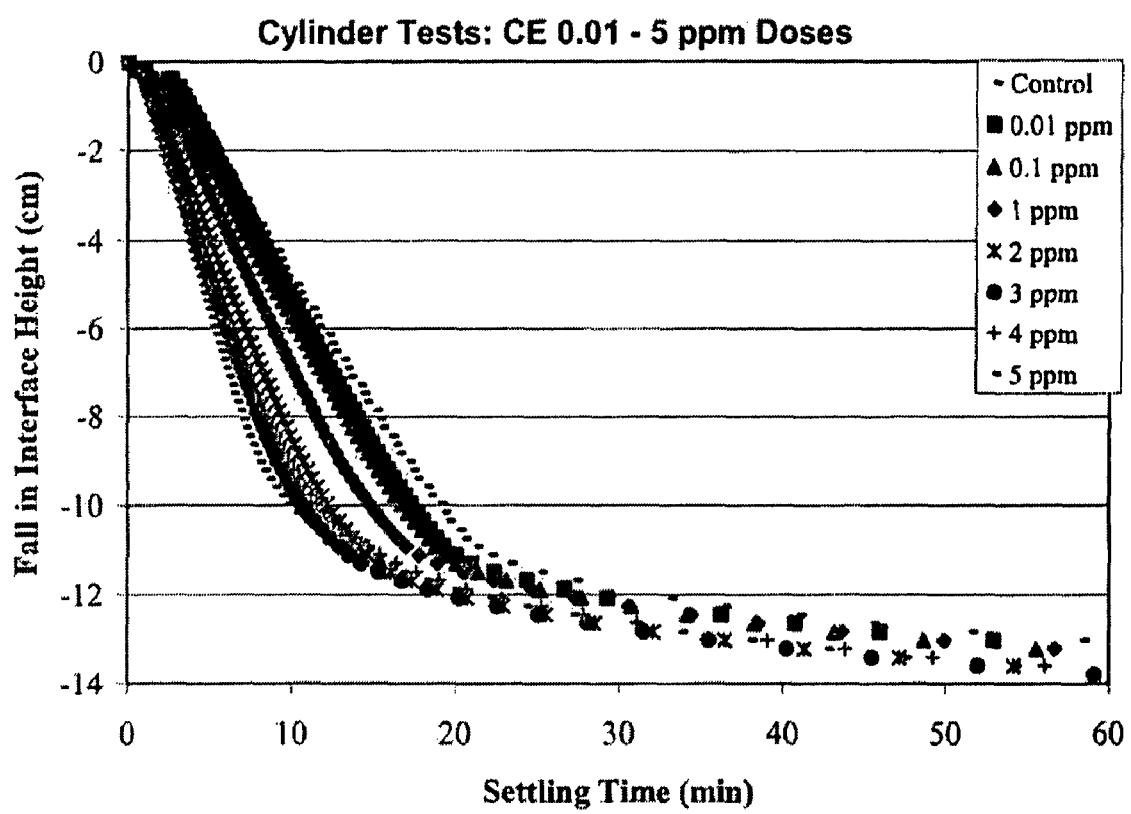

FIG. 6 is a graph showing the efficiency of the combined extract with increasing dosages. A 50 g/L of kaolin clay slurry were placed into a 100 mL cylinder. Flocculent was added to the slurry as either 0.01 ppm of non-gelling extract mucilage, 0.1 ppm of non-gelling extract mucilage, 1.0 ppm of non-gelling extract mucilage, 2.0 ppm of non-gelling extract mucilage, 3.0 ppm of non-gelling extract mucilage, 4.0 ppm of non-gelling extract mucilage, 5.0 ppm of non-gelling extract mucilage, or a negative control without flocculent. The cylinder was capped and inverted 10 times to mix and placed on a horizontal surface. The height of the interface between the supernatant and settling solids was measured and the rate of sedimentation calculated.

Figure 7:
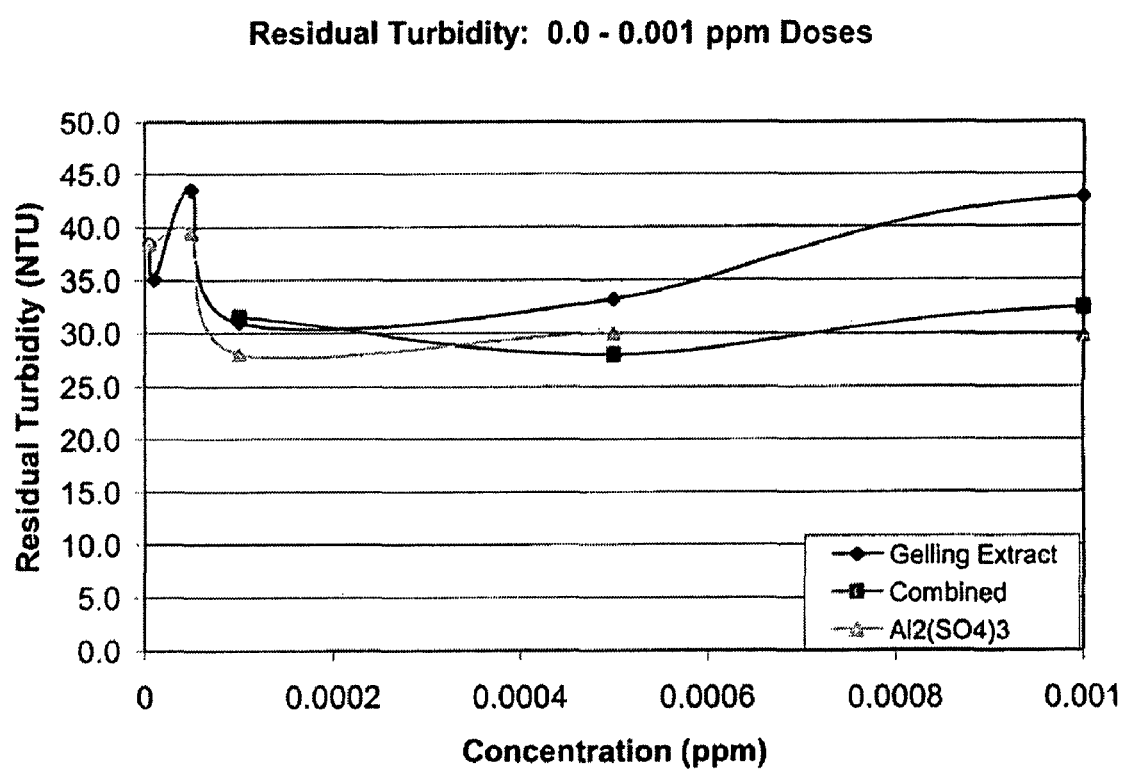

FIG. 7 is a graph showing the mucilage efficiency at reducing residual turbidity at very low doses—comparable with aluminum sulfate. Standard jar test for flocculent sedimentation. 0.5 g/L kaolin clay slurry was added to a test jar. The solution was stirred at 100 rpm and varying amounts of identified flocculent were added. After 2 minutes, the speed was reduced to 20 rpm for 5 minutes, and mixing was stopped. The solution was allowed to settle for 30 minutes, and turbidity tests were performed.

Figure 8:
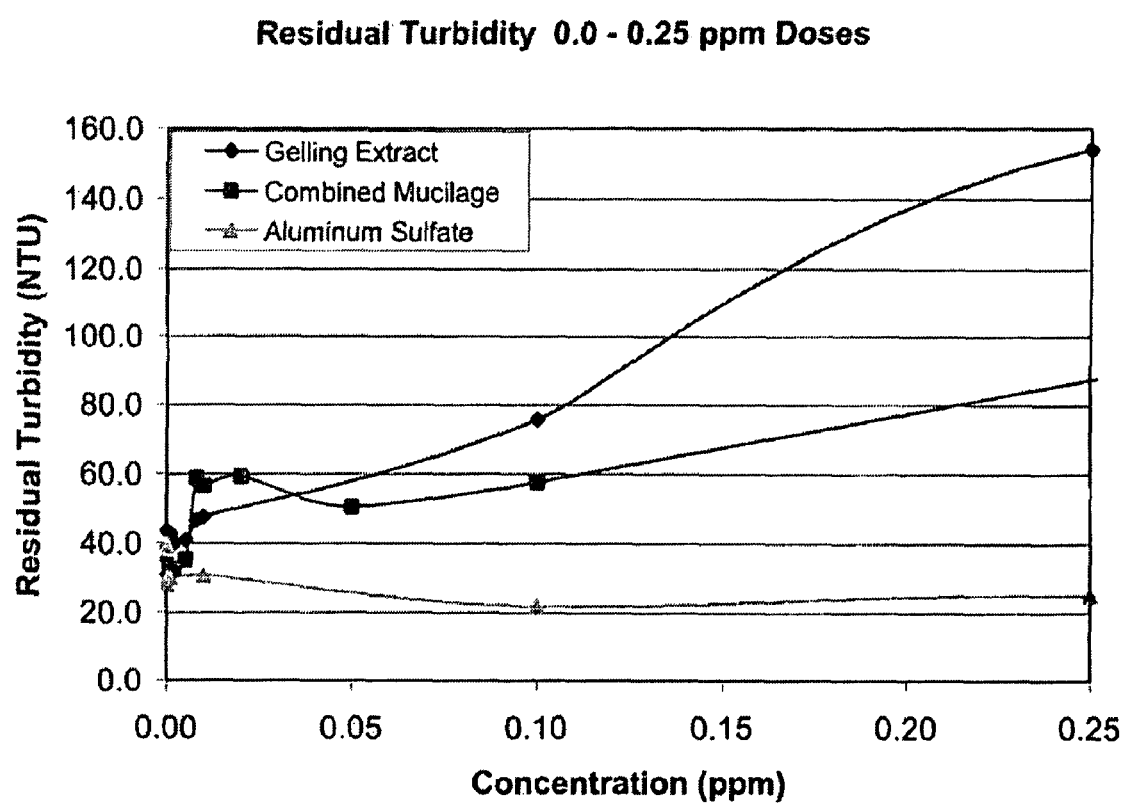

FIG. 8 is a graph showing the mucilage's departure from the efficiency of aluminum sulfate at higher doses. However, secondary filtration can be used to reduce the residual turbidity. Standard jar test for flocculent sedimentation. 0.5 g/L kaolin clay slurry was added to a test jar. The solution was stirred at 100 rpm and varying amounts of identified flocculent were added. After 2 minutes, the speed was reduced to 20 rpm for 5 minutes, and then mixing was stopped. The solution was allowed to settle for 30 minutes, and turbidity tests were performed.

Figure 9:
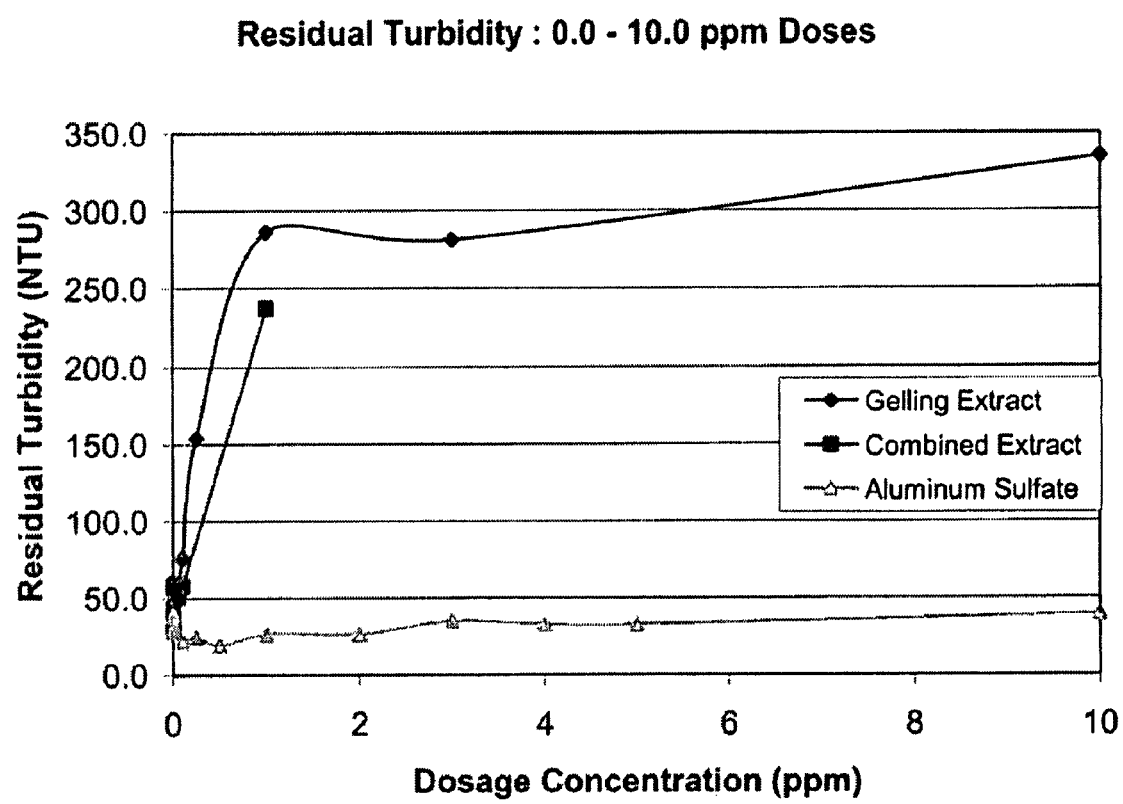

FIG. 9 is a graph showing mucilage efficiency at reducing residual turbidity at higher dosages. Standard jar test for flocculent sedimentation. 0.5 g/L kaolin clay slurry was added to a test jar. The solution was stirred at 100 rpm and varying amounts of identified flocculent were added. After 2 minutes, the speed was reduced to 20 rpm for 5 minutes, and then mixing was stopped. The solution was allowed to settle for 30 minutes, and turbidity tests were performed.

FIG. 10 is a graph showing water column arsenic levels after gelling extract mucilage treatment. Arsenic was dissolved in water at 290 μg/L. 30 ppm of gelling extract was added to the arsenic solution. After addition of the mucilage the appearance of solid metallic like particles was observed. After 30 minutes the particles settled to the bottom, embedded in the mucilage gel. A sample was analyzed.

Figure 11:
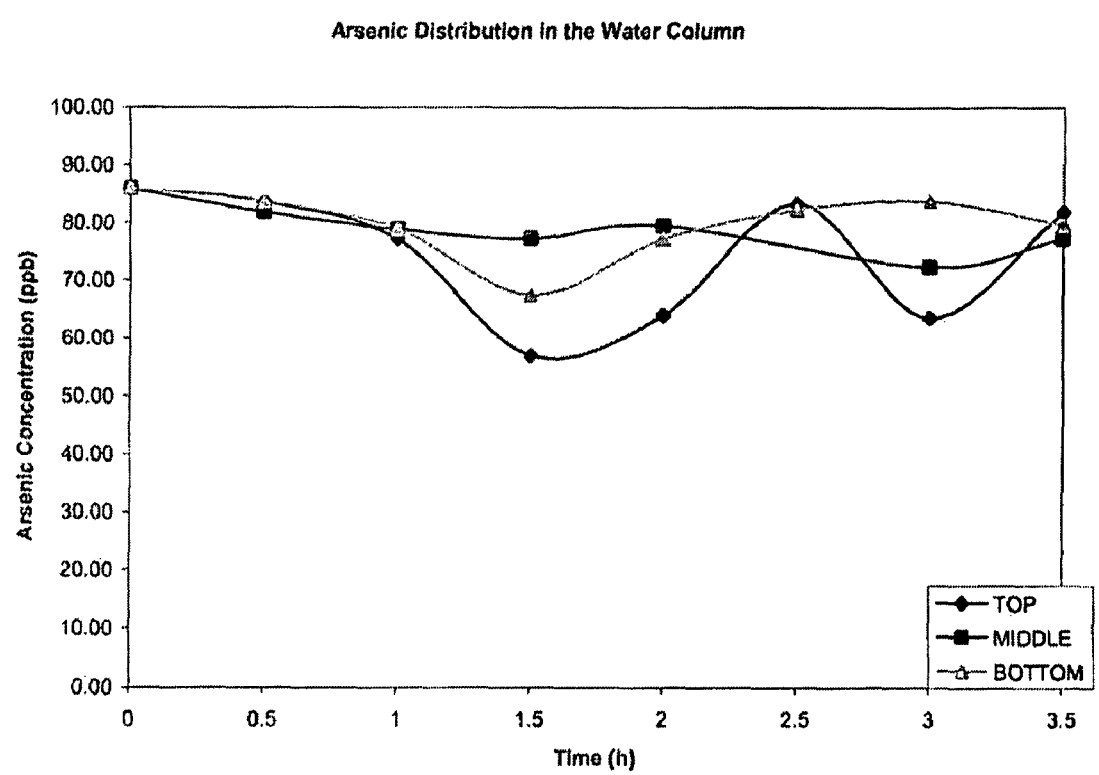

FIG. 11 is a graph showing water column arsenic distribution. 86 ppb arsenic was added to a 300 mL water column. The water was dosed with 5 ppm gelling mucilage extract. 36 hours later, 20 mL samples were taken from the top, middle, and bottom of the water column and analyzed for arsenic concentrations. An arsenic concentration profile was established.

Figure 12:
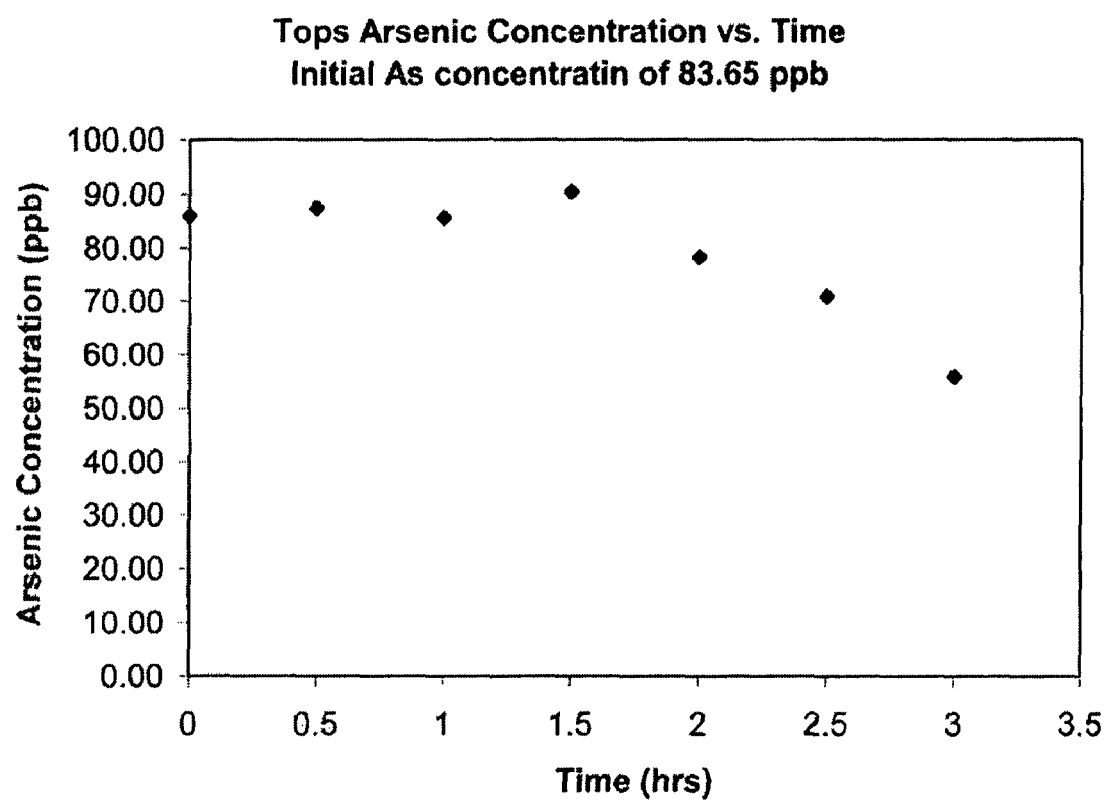

FIG. 12 is a graph showing that the make-up method improves the mucilage efficiency at reducing As concentration in a water column. 5 ppm gelling mucilage extract was added to a 300 mL water column, contaminated with 83.65 ppb of arsenic. The concentration of the gelling extract was maintained by removing the top 2% of the water column at 30 minute intervals and replacing the removed water with a 5 ppm gelling extract/water solution. Spent mucilage transports arsenic to the water-air interface, where the arsenic is removed every 30 minutes and replaced with new, active mucilage.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention includes a process for the removal of suspended solids and/or arsenic from drinking water using a natural-based flocculent, such as that derived from *Opuntia ficus* indica, or nopal, cactus. Three types of mucilage extract from the cactus are obtained (a gelling extract (GE), a non-gelling extract (NE), and a combined extract (CE)) and are used individually as a flocculent for the removal of harmful contaminants that reduce the potability of water. The process steps are (a) cactus pad maceration, (b) chosen mucilage fraction extraction, (c) aqueous dissolution of the solid extract, (d) contaminated water dosing, (e) flocculation, and (f) supernatant decantation.

Three types of mucilage were extracted: a gelling extract (GE) and a non-gelling extract (NE) were obtained, and a combined version (CE) consisting of GE & NE. Cactus plants were purchased from Living Stones Nursery, Tucson, Ariz. All mucilage types extracted were stored dry and at room temperature. For the extraction of NE and GE, cactus pads were cleaned and boiled in milli Q water until they became tender (approximately 20 minutes). The soft pads were then liquefied in a blender. The pH of the resulting suspension was then neutralized and the solids and liquid supernatant were separated in a centrifuge at 4000 rpm. The supernatant was collected, mixed with 1M-NaCl solution (10:1 ratio), filtered and precipitated with 1:2 ratio of pulp to acetone to produce the NE extract. The acetone was then decanted and the precipitate washed with a 1:1 volume ratio of precipitate to isopropanol. The resulting NE precipitate was air dried on a watch glass at room temperature. In order to separate the gelling portion, the centrifuged precipitates were mixed with 50 mL of 50 mM NaOH. The suspension was stirred for 10 min and the pH adjusted with HCl to 2. The suspension was centrifuged and the solids again resuspended in water while the pH was adjusted to 8 with NaOH. The suspension was then filtered and the solids were washed following the same procedure as for the NE extract. For the combined extract, the initial blend was centrifuged and the supernatant was separated and pH adjusted to 8 with NaOH, washed with acetone and isopropanol as described above and finally it was air-dried. On average, for each pad that weighs around 300 g wet weight, a 1.5-2 g dry powder is obtained.

A series of cylinder tests were performed, shown in FIGS. 1 through 6, to determine the flocculating efficiency of the three different varieties of mucilage produced the inventors. A kaolin slurry of 50 g/l was poured into a stoppered 100 ml cylinder, 3 ppm of mucilage flocculent solution or control was added, the cylinder was capped and inverted completely 10 times for total mixing of the contents, the cylinder was then placed on a horizontal surface and the height of the interface between the supernatant and the settling solids were recorded with time.

Figure 1:
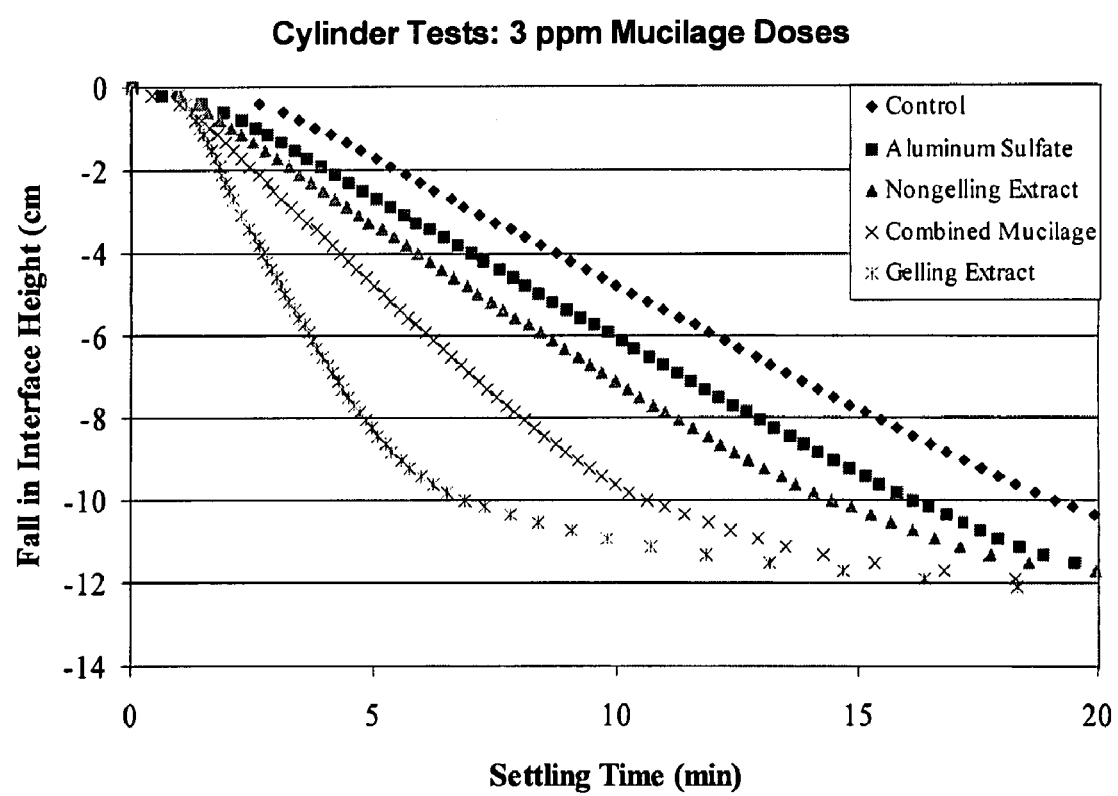
FIG. 1 is a graph comparing flocculation rates at 3 mg/L flocculent dosages. A kaolin solution was used at a concentration of 50 g/L, to mimic contaminated water containing a high concentration of particles. The flocculation characteristics of mucilage were tested with a total mucilage extract (3 ppm), a gelling extract harvested with the mucilage (3 ppm), or a non-gelling extract harvested with the mucilage (3 ppm).

The flocculation efficiency was tested, analyzing the three mucilage extracts against a positive control ($Al_2(SO_4)_3$) or a negative control (without flocculent). The flocculants were added at 3 ppm to the slurry and analyzed as described above. FIG. 1 shows the mucilage is an excellent flocculent of suspended solids compared to $Al_2(SO_4)_3$. Comparing the same dosage of mucilage and $Al_2(SO_4)_3$, the mucilage settled the same amount of particulate matter in 3.6 minutes as $Al_2(SO_4)_3$ did in 10 minutes. Further, smaller dosages of mucilage provided faster settling rates and the clearest supernatant. The mucilage was also found to reduce arsenic concentrations by 50% after 36 hours at low dosages.

The effective concentration and precipitation rates were determined for gelling extract (GE). The gelling extract was added to a 50 g/L kaolin slurry, described above, at 0.01 mg/L, 0.1 mg/L, 1 mg/L, 2 mg/L, 3 mg/L, and 4 mg/L. 4 mg/L of gelling extract mucilage precipitated most of the slurry within 10 minutes, whereas 3 mg/L required 20 minutes to precipitate the same amount of clay slurry, seen in FIG. 2. However, the precipitation rates from 0.01 mg/L to 3 mg/L were significantly closer, the 0.01 mg/L mucilage extract requiring about 5 minutes more than the 3 mg/L extract, and 15 minutes more than the 4 mg/L extract, to precipitate the same amount of slurry. Thus, the gelling extract was most effective at a very higher concentration, but the extract concentration did not drastically affect the precipitation rates from low to mid level extract concentrations. The difference between concentrations is more pronounced from 1 minute to 4 minutes after addition of the flocculent to a colloid solution, as depicted in FIG. 3. 4 mg/l gelling mucilage extract precipitated the slurry much quicker than any other concentration, reducing the level of slurry about 8.5 cm in three minutes. The next most effective concentration, 3 mg/l, reduced the slurry 6 cm in the same time. Lower concentrations had less effect on the level of the slurry, reducing the slurry level about 3 cm during the three minute period.

The non-gelling mucilage extract (NE) was then tested to determine the effective dose. Nongelling extract was added to a 50 g/L kaolin slurry, described above, at 0.01 mg/L, 0.1 mg/L, 1 mg/L, 2 mg/L, 3 mg/L, and 4 mg/L. Unlike the gelling extract, the non-gelling extract is less affected by concentration, as seen in FIG. 4. Between 2 mg/L and 5 mg/L, the nongelling extract reduces the slurry by approximately 12 cm in 20 minutes. However, lesser nongelling extract concentrations, between 0.01 mg/L and 2 mg/L, reduce the slurry level by 10 cm in the same time and require about 30 minutes to reduce the slurry level by 12 cm. Further, the lower concentrations precipitate the slurry at the same rate as the negative control. The precipitation rates are seen more dramatically between 2 and 13 minutes, shown in FIG. 5. The 5 mg/L extract precipitates the slurry most rapidly, removing about 6 cm in 5 minutes. The nongelling extract exhibited similar precipitation rates from 2 mg/L to 4 mg/L, removing from 4.25 to 5 cm of slurry in 5 minutes. At lesser concentrations, from 0.01 mg/L to 1 mg/L, the nongelling extract precipitates the slurry at the same rate as the negative control, about 3 cm in 5 minutes.

The combined extract (CE) exhibited similar precipitation properties to the nongelling extract. The combined extract was added to a 50 g/L kaolin slurry, described above, at 0.01 mg/L, 0.1 mg/L, 1 mg/L, 2 mg/L, 3 mg/L, and 4 mg/L. High concentrations of the combined extracts, between 2 ppm and 5 ppm, precipitate about 11 cm of slurry in 10 minutes and 12 cm in 20 minutes, seen in FIG. 6. Lower concentrations of the combined extract required 20 minutes to precipitate the slurry 10 cm, approximately precipitating the slurry at the same rate as the control.

Flocculation studies were conducted using the standard jar test, where previously prepared kaolin solutions at 0.5 g/l were poured into the jars of the jar test apparatus, then stirring at 100 rpm was started and different quantities of the flocculent solutions were added to each jar always leaving one without flocculent added to serve as a control. The contents were stirred for 2 minutes and then the speed was reduced speed to 20 rpm for 5 minutes. After this, agitation was stopped and the contents were allowed to settle for 30 minutes before collecting a sample and measuring its turbidity. At lower concentrations, the combined mucilage extract mirrors the residual turbidity characteristics of aluminum sulfate, as shown in FIG. 7. Higher concentrations of aluminum sulfate are more effective at reducing the residual turbidity of the solution, shown in FIGS. 8 and 9. However, secondary filtration may be used to remove residual particulates, if desired.

The capacity of the gelling mucilage extract to reduce arsenic from water was then determined. A 290 ng/L arsenic solution was dosed with 30 ppm of gelling mucilage extract. After the gelling mucilage extract was added, solid metalliclike particles were observed forming in the solution. After 30 minutes the particles settled to the bottom, embedded in the mucilage gel. A sample of the solution was analyzed, as seen in FIG. 10. The mucilage flocculent treatment yielded a reduction of approximately 11% of the As of the original solution, compared to about 50% for the control, proving the interaction between the gelling extract and As.

To determine the action of the mucilage when removing Arsenic, 86 ppb of arsenic was added to a 300 ml water column The water was dosed with 5 ppm gelling mucilage extract. After 36 hours, a 20 ml sample from the top, middle, and bottom of the water column were taken and analyzed for arsenic concentration. The arsenic concentration profile was determined, shown in FIG. 11. Water taken from the middle of the water column had steady concentrations of arsenic, whereas the top and bottom of the water column had fluctuating arsenic concentrations. Arsenic concentrations in the combined water column were lowest at 1.5 hours, and began to rise again at 2 hours, indicating the mucilage was saturated and the treatment allowed arsenic to redissolve. However, arsenic concentrations did go down over time.

The capacity of the gelling mucilage extract to remove arsenic from contaminated water at low concentration dosing was determined using the make-up. A concentration of 5 ppm gelling mucilage extract was established in a water column The top 2% of the water column was removed at 30 minute intervals and the water column volume restored to the original amount by adding a 5 ppm gelling mucilage extract/water solution to the contaminated water column Spent mucilage transports arsenic to the water-air interface where it is removed. The mucilage thus facilitates the removal of arsenic, as seen in FIG. 12.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described, What is claimed is:

1. A method of removing contaminants from water, comprising the steps of:
    adding a cactus mucilage extract to the water, wherein the cactus mucilage extract is a gelling extract or non-gelling extract isolated from a cactus,
        wherein the gelling extract is isolated comprising the steps of:
            liquefying cactus plant pads to form a suspension;
            neutralizing the pH of the suspension;
            centrifuging the suspension to separate precipitates from a liquid supernatant;
            collecting the precipitate;
            adding sodium hydroxide to the collected precipitate to form a suspension;
            adjusting the pH of the suspension to 2 with hydrochloric acid;
            centrifuging the suspension to form solids;
            resuspending the solids in water, and adjusting the pH of the water to 8 using sodium hydroxide;
            precipitating the extract with acetone;
        wherein the non-gelling extract is isolated comprising the steps of:
            liquefying cactus plant pads to form a suspension;
            neutralizing the pH of the suspension;
            centrifuging the suspension to separate solids from a liquid supernatant;
            collecting the liquid supernatant; mixing the liquid supernatant with a sodium chloride solution to form a pulp;
            adding acetone to the pulp at a ratio of acetone to pulp of 1:2 to form a precipitate;
            washing the precipitate with isopropanol at a ratio of 1:1;
    mixing an effective concentration of the cactus mucilage extract the water to remove the contaminants by flocculation, wherein the cactus mucilage extract is the non-gelling extract, the gelling extract, or the combined non-gelling and gelling extract;
    allowing contaminants in the water to settle; and
    separating the settled contaminants from the water.

2. The method of claim 1, wherein the cactus plant is *Opuntia ficus-indica*.

3. The method of claim 1, wherein contaminated water is removed from the upper surface of the water, thereby removing the contaminants from the water.

4. The method of claim 1, wherein the plant mucilage extract is the gelling extract.

5. The method of claim 1, wherein the contaminants are selected from the group consisting of heavy metals, arsenic, and particulate matter.

6. The method of claim 1, wherein the cactus mucilage extract is stored in dry powder form.

7. The method of claim 1, wherein the cactus plant mucilage extract is the non-gelling extract.

8. A method of removing contaminants from water, comprising the steps of:
    adding a gelling mucilage extract to the water, wherein the gelling mucilage extract is extracted from a cactus plant by the steps of:
        liquefying cactus plant pads to form a suspension;
        neutralizing the pH of the suspension;
        centrifuging the suspension to separate precipitates from a liquid supernatant;
        collecting the precipitate;
        adding sodium hydroxide to the collected precipitate to form a suspension;
        adjusting the pH of the suspension to 2 with hydrochloric acid;
        centrifuging the suspension to form solids;
        resuspending the solids in water, and adjusting the pH of the water to 8 using sodium hydroxide;
        precipitating the gelling mucilage extract with acetone;
    mixing an effective concentration the gelling mucilage extract with the water to remove the contaminants by flocculation;
    allowing contaminants in the water to settle; and
    separating the settled contaminants from the water.

9. The method of claim 8, wherein the cactus plant is *Opuntia ficus-indica*.

10. The method of claim 8, wherein contaminated water is removed from the upper surface of the water, thereby removing the contaminants from the water.

11. The method of claim 8, wherein the contaminants are selected from the group consisting of heavy metals, arsenic, and particulate matter.

12. The method of claim 8, wherein the gelling mucilage extract is stored in dry powder form.

13. A method of removing contaminants from water, wherein the contaminant is selected from the group consisting of heavy metals, arsenic, and particulate matter, comprising the steps:
- adding a plant mucilage extract to the water, wherein cactus mucilage extract is gelling extract, non-gelling extract, or combined gelling and non-gelling extract extracted from a cactus plant by the steps of:
- wherein the gelling extract is isolated comprising the steps of:
  - liquefying cactus plant pads to form a suspension;
  - neutralizing the pH of the suspension;
  - centrifuging the suspension to separate precipitates from a liquid supernatant;
  - collecting the precipitate;
  - adding sodium hydroxide to the collected precipitate to form a suspension;
  - adjusting the pH of the suspension to 2 with hydrochloric acid;
  - centrifuging the suspension to form a solids;
  - resuspending the solids in water, and adjusting the pH of the water to 8 using sodium hydroxide;
  - precipitating the extract with acetone;
- wherein the non-gelling extract is isolated comprising the steps of:
  - liquefying cactus plant pads to form a suspension;
  - neutralizing the pH of the suspension;
  - centrifuging the suspension to separate solids from a liquid supernatant;
  - collecting the liquid supernatant; mixing the liquid supernatant with a sodium chloride solution to form a pulp;
  - adding acetone to the pulp at a ratio of acetone to pulp of 1:2 to form a precipitate;
- washing the precipitate with isopropanol at a ratio of 1:1;
- mixing an effective concentration of the cactus plant mucilage extract into the water to remove the contaminants by flocculation, wherein the cactus mucilage extract is the non-gelling extract, the gelling extract, or the combined non-gelling and gelling extract;
- allowing contaminants in the water to settle; and
- separating the settled contaminants from the water.

14. The method of claim 13, wherein the particulate matter is filtered from water after the particulate matter is precipitated from the water.

15. The method of claim 13, wherein the cactus plant is *Opuntia ficus-indica*.

16. The method of claim 13, wherein the cactus plant mucilage extract the non-gelling extract.

17. The method of claim 13, wherein the cactus plant mucilage extract is the combination of gelling and non-gelling extract.

* * * * *